United States Patent
Vincent et al.

(10) Patent No.: US 10,524,029 B2
(45) Date of Patent: Dec. 31, 2019

(54) OPTICAL CIRCUIT SWITCH

(71) Applicant: HEWLETT PACKARD ENTERPRISE DEVELOPMENT LP, Houston, TX (US)

(72) Inventors: Francois Vincent, Corenc (FR); David Penkler, Claix (FR); Benoit Minster, St Ismier (FR)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/523,336

(22) PCT Filed: Oct. 8, 2015

(86) PCT No.: PCT/US2015/054689
§ 371 (c)(1),
(2) Date: Apr. 28, 2017

(87) PCT Pub. No.: WO2016/069235
PCT Pub. Date: May 6, 2016

(65) Prior Publication Data
US 2017/0251285 A1    Aug. 31, 2017

(30) Foreign Application Priority Data
Oct. 31, 2014  (EP) .................................... 14306752

(51) Int. Cl.
*H04Q 11/00*    (2006.01)
(52) U.S. Cl.
CPC ... *H04Q 11/0005* (2013.01); *H04Q 2011/005* (2013.01); *H04Q 2011/0016* (2013.01); *H04Q 2011/0039* (2013.01)
(58) Field of Classification Search
CPC ....... H04Q 11/0005; H04Q 2011/0016; H04Q 2011/0056; H04Q 2011/005; H04Q 2011/0039
See application file for complete search history.

(56) References Cited

U.S. PATENT DOCUMENTS 7,840,136 B1 *  11/2010  Cunningham ........... H04Q 3/66
                                                                 385/16
8,121,478 B2    2/2012   Kash et al.
(Continued)

FOREIGN PATENT DOCUMENTS

WO    WO-2009113977 A1    9/2009

OTHER PUBLICATIONS

Chen, L., "Silicon Photonic Integrated Circuits for WDM Technology and Optical Switch," (Research Paper), Mar. 17-21, 2013, 3 pages, available at http://ieeexplore.ieee.org/stamp/stamp.jsp?arnumber=6533087.
(Continued)

*Primary Examiner* — Mina M Shalaby
(74) *Attorney, Agent, or Firm* — Sheppard Mullin Richter & Hampton LLP

(57) ABSTRACT

An example system can comprise an optical circuit switch. An input port module can receive an input optical signal comprising a plurality of input components, perform an optical to electrical to optical conversion on the input optical signal, multiplex the plurality of input components to an internal optical signal, and transmit first internal optical signal on a first internal waveguide. A switch module can receive the internal optical signal and transmit the transformed internal optical signal on a second internal waveguide according to a predefined control algorithm, which can permit any input component to be mapped to any frequency group and sent to any output component. An output port module can receive the internal optical signal, perform another optical to electrical to optical conversion on the internal optical signal, and demultiplex the internal optical signal to an output optical signal comprising a plurality of output components.

14 Claims, 10 Drawing Sheets

(56) References Cited

U.S. PATENT DOCUMENTS

| | | |
|---|---|---|
| 8,639,074 B2 | 1/2014 | Tang et al. |
| 2012/0251042 A1 | 10/2012 | Julien et al. |
| 2013/0108215 A1* | 5/2013 | Ticknor .................. G02B 6/35 385/17 |
| 2013/0287397 A1 | 10/2013 | Frankel et al. |
| 2014/0003760 A1 | 1/2014 | Bernasconi et al. |
| 2014/0029951 A1 | 1/2014 | Handlelman |
| 2014/0153873 A1 | 6/2014 | Kang et al. |
| 2015/0076923 A1* | 3/2015 | Frankel .................. B81B 7/008 307/113 |
| 2017/0195756 A1* | 7/2017 | Schemmann ...... H04Q 11/0005 |

OTHER PUBLICATIONS

Extended European Search Report in EP Application No. 14306752.8, dated Apr. 16, 2015, 6 pages.
International Search Report & Written Opinion in PCT Application No. PCT/US2015/054689, dated Nov. 20, 2015, 12 pages.
Vahdat, A. et al., "The Emerging Optical Data Center," Optical Fiber Communication Conference, Optical Society of America, 2011, 3 pages, available at http://citeseerx ist psu edu/viewdoc/download?doi=10 1 1 446 2582&rep=rep1&type=pdf.

\* cited by examiner

OPTICAL CIRCUIT SWITCH

BACKGROUND

Traditional electrical data transmissions are limited when transmitting large amounts of data at the high data rates required by many data centers. Optical data transmission, in which optical signals can be modulated and encoded with information for data transfer, has emerged as a viable alternative to electrical data transmission in these circumstances. Accordingly, various optical technologies have been developed to accommodate transmission and switching of data by optical signals. For example, microelectromechanical systems (MEMS)-based switches use mirrors to switch the optical signals. However, these MEMS-based switches exhibit a slow switching time, making the MEMS-based switches impractical for real-time reconfiguration of routes for the transmission of large data sizes at high data rates. Additionally, MEMS-based switches are both difficult and expensive to fabricate.

DETAILED DESCRIPTION

Figure 1:
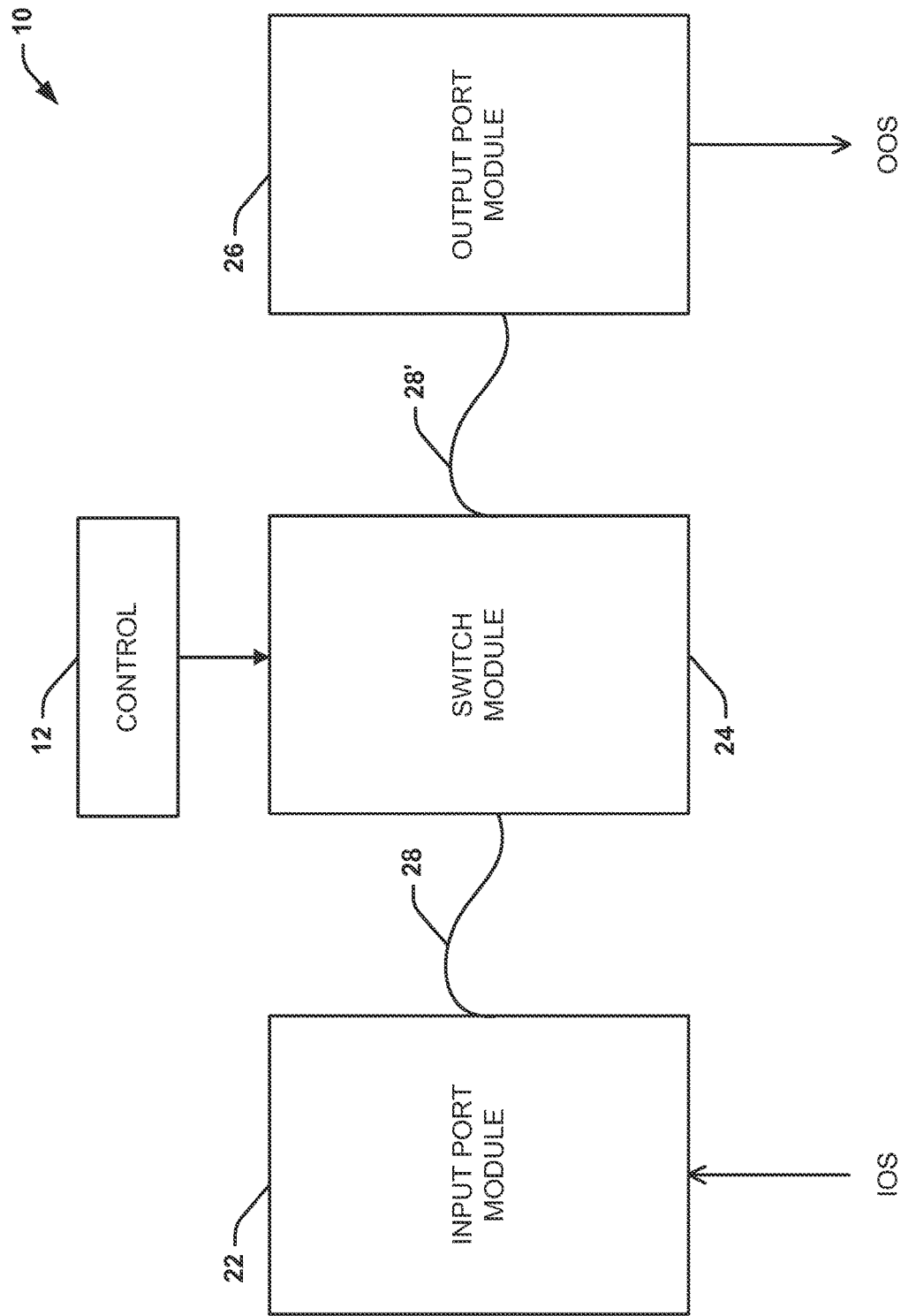
FIG. 1 illustrates an example of an optical circuit switch that can be used for optical data transmissions.

An optical circuit switch can be constructed from silicon photonic components implemented on an integrated circuit chip to transmit data between different machines (e.g., servers and switches) at different points in a data center. The silicon photonic components (e.g., silicon waveguides, ring resonators, multiplexers, demultiplexers, etc.) of the optical circuit switch can be fabricated on the integrated circuit chip according to traditional semiconductor fabrication techniques as part of an integrated circuit chip. The optical circuit switch can switch and transmit large amounts of high bandwidth data between two different machines using an optical to electrical to optical conversion at the inputs and outputs, where the electrical transmission takes place over a short distance so not to suffer from an appreciable lag or large power consumption. The optical circuit switch provides an alternative to MEMS-based switches with a faster switching time (e.g., on the order of µs rather than ms) and a cheaper manufacturing cost. Moreover, the optical circuit switch takes up less space than MEMS-based switches. Additionally, the application of switch architecture rules provides for scalability for the optical circuit switch into larger devices (e.g., a 12-port optical circuit switch).

The optical circuit switch can address several network issues. In one example, cabling of fiber optic networks is generally fixed and can be very costly to modify. The modifications generally require manual intervention of a skilled operator and a relatively long interruption of the connections, even for a simple swap of two connections. The impact of the interruption can be exacerbated when the data rates supported by the optical links are very high (e.g., >=100 Gbit/s). If the optical circuit switch is in the right place in the chain, a modification (or dynamic switching) of the interconnections is possible in a short time (e.g., less than 10 µs), without manual intervention. The ability to dynamically switch the physical interconnection allows a high performance computing cloud service provider to reconfigure the network to form the appropriate optical topologies as required by the customer's application. Examples of such networks are available in the context of systems interconnected with application specific topologies, like torus, different forms of hypercubes, and the like.

In another example, some applications require frequent modification of the network connectivity. This is possible with the optical circuit switch that can be programmed directly at the application level to guarantee exclusive high-speed connectivity between pairs of systems or clusters of systems based on the communication pattern imposed by a distributed algorithm. Ideally, for minimal latency and maximum bandwidth, each pair of systems or cluster of systems can be linked to each other directly in a full mesh topology (e.g., requiring $N*(N-1)/2$ point-to-point links, where N is the number of points/nodes/systems). By connecting the nodes in one or more star configurations with the optical circuit switch at the center of each star, multiple topologies can be configured. The number of stars can be determined by the number of concurrent transfers that a single node is required to perform, which is generally much lower than the total number of nodes. By dynamically reconfiguring the pairwise connectivity in a regular permutation as determined by the communication patterns imposed by the distributed computation algorithm, the advantages of full mesh connectivity can be closely approximated.

In an example, the optical circuit switch can include an input port module, which can receive an input optical signal comprising a plurality of input components, perform an optical to electrical to optical conversion on the input optical signal, multiplex the plurality of input components to an internal optical signal, and transmit first internal optical signal on a first internal waveguide. The optical circuit switch can also include a switch module can receive the internal optical signal and transmit the transformed internal optical signal on a second internal waveguide according to a predefined control algorithm, which can permit any input component to be mapped to any frequency group and sent to any output component. The optical circuit switch can also include an output port module which can receive the internal optical signal, perform another optical to electrical to optical conversion on the internal optical signal, and demultiplex the internal optical signal to an output optical signal comprising a plurality of output components An example of an optical circuit switch 10 is illustrated in FIG. 1. The optical circuit switch 10 can establish a direct path for data transmissions between two nodes (e.g., servers in a data center or other computing device) at different points in a network through a dedicated communications channel (or "circuit"). Accordingly, the optical circuit switch 10 can be well suited for applications where an exclusive connection is required temporarily between the two nodes. As an example, the optical circuit switch 10 can be used in conjunction with Ethernet switches for optical data transmission (e.g., at 100 gigabits per second (GBase) and/or 40 GBase. In these examples, the optical circuit switch 10 can re-modulate the signal at the outputs and exhibit a negative loss (i.e., a gain) so the optical circuit switch does not impose any link power budget constraints, and can be used in some configurations to overcome them. Additionally, the optical circuit switch 10 can be constructed at a cheaper manufacturing cost than standard MEMS based switch because standard semiconductor fabrication processes can be used to create the optical circuit switch 10.

Employing the optical circuit switch 10, optical signals that be modulated to include information related to a data transfer can be converted into a set of frequencies suitable for transmission over silicon waveguides and routed to an output based on one or more switches that include various (active and passive) silicon photonic components. The optical circuit switch 10 can be non-blocking so that all the output ports (of output port module 26) can be connected to their corresponding input ports (of input port module 22) simultaneously for all possible symmetric pairwise combinations. For N ports the number of possible combinations can be computed by the recurrence relation $S_N = S_{N-1} (N-1)*S_{N-2}$ where $S_1 = 1$ and $S_2 = 2$. Importantly, the input signal at each of the input ports can be assigned to one of the internal frequency groups based on a permutation that can be set or known according to the control function (also referred to as a control algorithm) employed by control 12.

Additionally, the optical circuit switch 10 can include semiconductor components (including silicon photonic components), including ring resonators, silicon waveguides for internal transmission, multiplexers that can combine signals (e.g., 2-1 or 3-1) for transmission on a waveguide, demultiplexers that can separate the multiplexed signals, light sources (e.g., lasers, diodes, or the like), and the like. In one example, ring resonators can be microring resonators that can be used for modulation, switching, and detection of individual frequencies. In other examples, the ring resonators can be large rings that can be used to gang switch internal frequencies (e.g., four interleaved combs) simultaneously. In some examples, the ring resonator detectors can be replaced with waveguide integrated photoreceptors and the transmitters with Mach-Zehnder modulators. For example, individual light sources can be used to generate the internal frequencies and the output frequencies (e.g., standard LAN frequencies). The silicon photonics, including the various silicon and other semiconductor components, can be manufactured on a single silicon die. In an example, the semiconductor components can be fabricated on an integrated circuit chip using standard semiconductor fabrication techniques.

The optical circuit switch 10 can include modules (e.g., an input port module 22, a switch module 24, and an output port module 26) that can be constructed from silicon components on an integrated circuit chip. Examples of silicon components that can be used to construct the modules can include ring resonators, waveguides, multiplexers, demultiplexers, and the like. As an example, the input port module 22 and the output port module 26 can correspond to the IEEE 802.3bm optical LAN termination standard (or similar standard governing the optical transmission of data). The optical signal can be a multi-frequency encoded signal that includes a set of encoded signals. For example, the optical signal can be a 100 GBase signal or a 40 GBase signal that includes a set of four signals (at 10 Gbps for the 40 GBase and 25 Gbps for 100 GBase).

For example, the input port module 22 and the output port module 26 can each utilize an optical to electrical to optical conversion. Accordingly, both can include a light source (e.g., laser) that can be modulated. The input port module 22 and the output port module 26 can include a ring, a Mach-Zehnder interferometer, or other device to modulate the signal emitted by the light source. As another example, the modulation can be direct laser modulation (e.g., via a vertical-cavity surface emitting laser (VCSEL)). Even if the optical to electrical to optical conversion is not ideal from a power consumption perspective, it opens the possibility for data packets to be processed electronically for statistics/ management purposes. For example, the electrical signal can be transmitted only across a short distance.

The input port module 22 can receive an input optical signal (IOS) that can be modulated with data to be transmitted by the optical circuit switch 10. In some instances, the input optical signal (IOS) can include a plurality of components that can correspond to a certain frequency. In these instances, the input port module can include a plurality of input ports corresponding to the different components. For example, the input signal can be a coarse wavelength division multiplexed (CWDM) signal (e.g., with 8 or fewer frequencies being multiplexed) that can include four components and the input port module 22 can include four input ports that can receive the four different components of the CWDM signal. The input port module 22 can multiplex the plurality of components to enable transmission on a silicon waveguide 28. As an example, the multiplexing is possible if each of the four components of the input CWDM signal are re-encoded onto a single set of frequencies (e.g., one of the four groups of four internal frequencies). Each of the four input components can be mapped to any one of the internal frequency groups. For example, the mapping can be controlled based on a permutation employed by the control 12.

The control 12 can establish permutations within the set of inputs such that the signals from one physical input can be assigned to any one of the internal frequency groups. These permutations can be set or known according to the control function employed by control 12. For example, in a case of a switch with eight input ports, the control 12 provides a vector of eight numbers being a permutation of the vector [0 1 2 3 4 5 6 7] (e.g., with numbers 0-7) that govern how the inputs correspond to the outputs. For example in the control command to configure the switch with the following vector [3 2 1 0 7 6 5 4] the first input port 0 corresponds to the number 3 in the vector, the fourth input port 3 can correspond to the number 0 in the vector, and so on. Depending on the permutation given in the control command the control 12 determines the appropriate group of internal frequencies to map the input signals to and drives the ring resonators to switch the corresponding groups from the input waveguides to the output waveguides. The control 12 can signal the output module to map which inputs it is receiving to which port.

Figure 2:
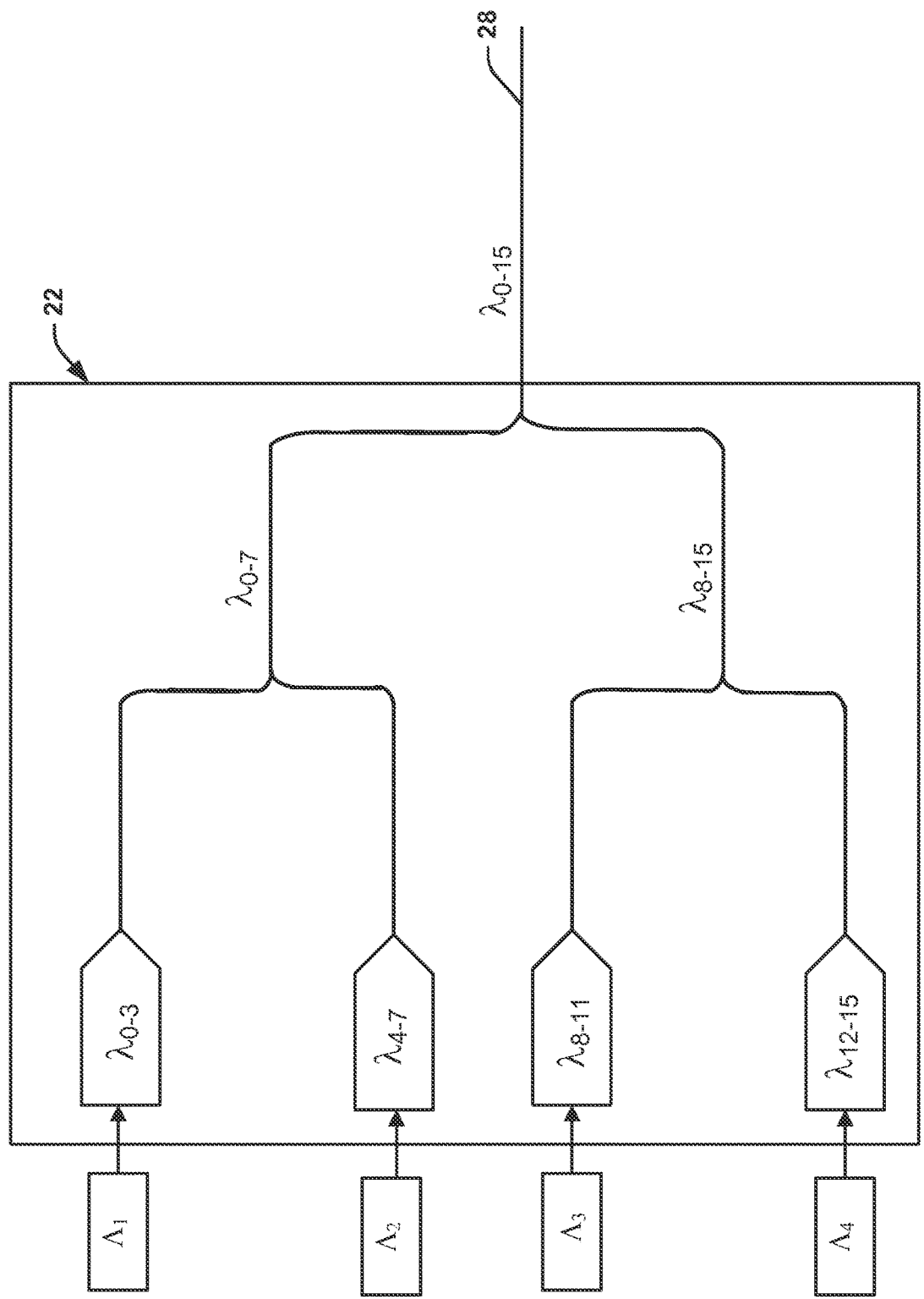
FIG. 2 illustrates an example multiplexer that can merge signals of different frequencies on a single waveguide.

An example of a multiplexer that can be employed by the input port module 22 is shown in FIG. 2. The multiplexer can merge signals (e.g., components of the input optical signal (IOS)) of different frequencies (e.g., $\lambda_{0-3}$, $\lambda_{4-7}$, $\lambda_{8-11}$, and $\lambda_{12-15}$) into a multiplexed signal (e.g., an internal optical signal) that couples the components with different frequencies (e.g., $\lambda_{0-15}$) that can be transmitted on a silicon waveguide 28. In the example shown in FIG. 3, the multiplexer can merge two signals at once, requiring two different multiplex steps to merge the four components into the signal that can be transmitted on the silicon waveguide 28. However, other implementations of a multiplexer can be utilized to multiplex the components into a single signal that can be transmitted on the silicon waveguide 28. As an example, the multiplexed signal can be a dense wavelength division multiplexing (DWDM) signal (e.g., with 16 or more frequencies being multiplexed) that can transmit the plurality of different components at the same time on their own separate wavelengths.

The silicon waveguide 28 can transmit the multiplexed signal from the input port module 22 to a switch module 24 that can transmit the signal from the input port module 22 to the output port module 26 according to a control 12 that sets forth a control algorithm. The switch module 24 can receive the multiplexed signal from the silicon waveguide 28 and demodulate the signal utilizing a plurality of ring resonators corresponding to the number of input ports of the input port module 22. For example, the ring resonators can be specific to a certain frequency or group of frequencies, similar to a tuning fork. An example of a demultiplexer that can be used by the switch module 24 is shown in FIG. 3.

Figure 3:
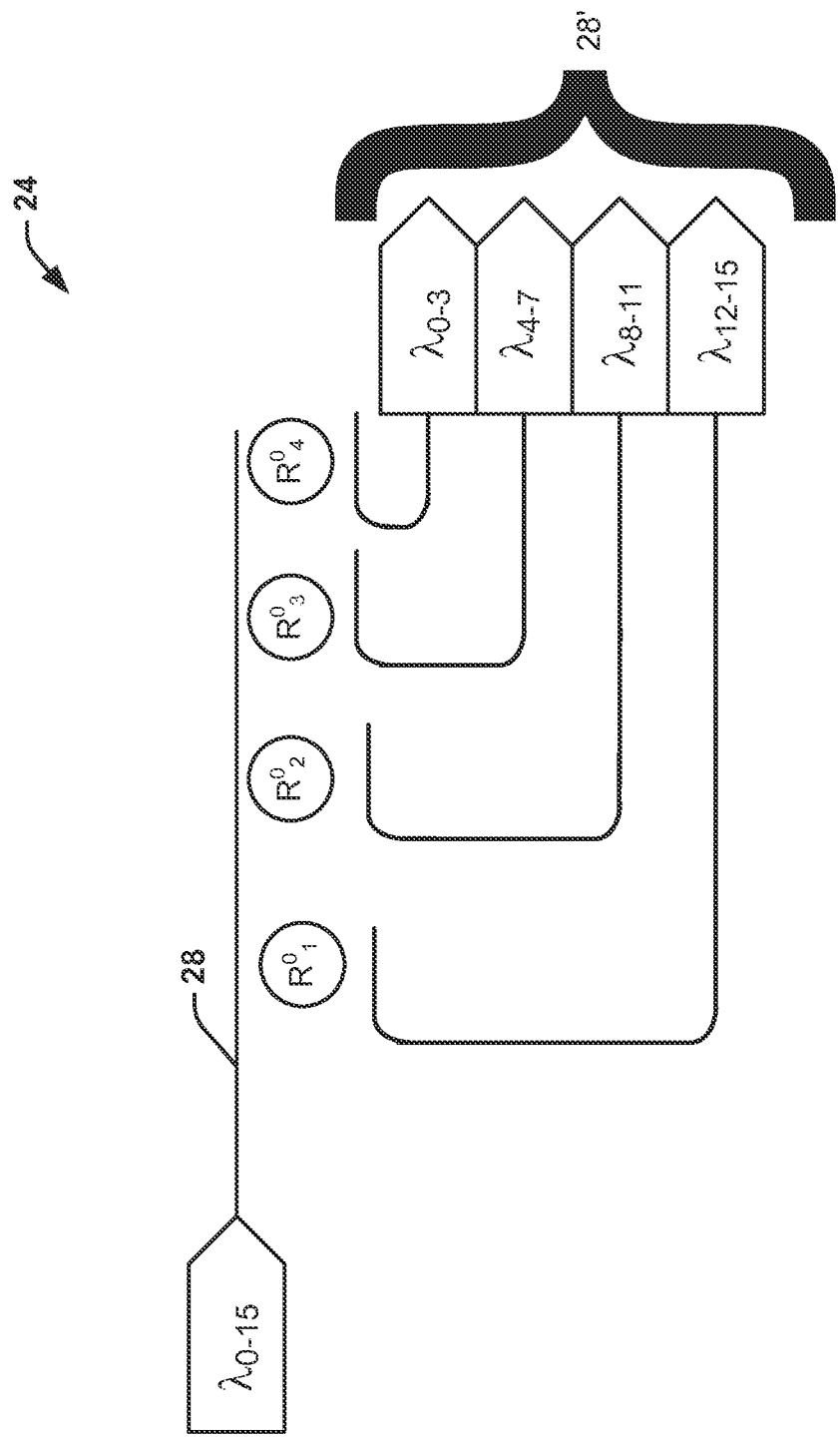
FIG. 3 illustrates an example of a demultiplexer that can separate signals of different frequencies merged on a single waveguide based on multi-frequency ring resonators.

The demultiplexer of FIG. 3 can receive a multiplexed signal carrying different frequencies (e.g., $\lambda_{0-15}$) from a silicon waveguide 28. The demultiplexer can include a plurality of ring resonators (e.g., $R^o_1$, $R^o_2$, $R^o_3$, and $R^o_4$) that can be constructed of silicon and coupled to the waveguide. Each of the plurality of ring resonators can resonate with a group of frequencies (e.g., different groups of four frequencies, like $\lambda_{0-3}$, $\lambda_{4-7}$, $\lambda_{8-11}$, and $\lambda_{12-15}$). The group of frequencies carried by each component can be blocked on the inbound waveguide after the respective ring resonator.

Referring again to FIG. 1, the switch module 24 can transmit the demultiplexed signals on an output waveguide 28'. In some examples, the switch module 24 can include an amplifying frequency shifter that can perform amplification. For example, the amplification can occur by the amplifying frequency shifter which can detect a weaker optical signal and regenerate and/or modulate a stronger optical signal at a shifted frequency.

Figure 4:
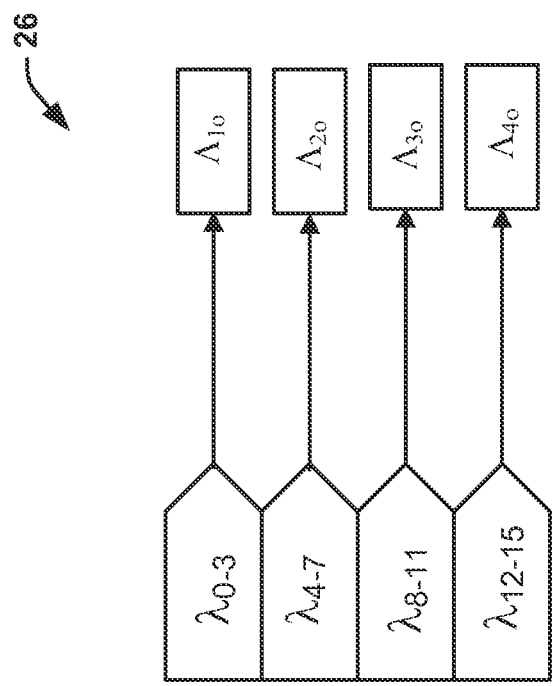
FIG. 4 illustrates an example configuration of a conversion from an internal frequency to a frequency for transmission externally.

The output waveguide 28' can transmit the internal output signal to an output port module 26, as shown in FIG. 4. The output port module 26 can convert the second internal optical signal to an output optical signal (OOS). As an example, the output optical signal (OOS) can include a plurality of output components. In these instances, the output port module 26 can include a plurality of output ports, each corresponding to one of the components. This correspondence can be predefined according to the control algorithm. In some examples, the output optical signal (OOS) can be a CWDM signal.

The components of the output signal can be related to the components of the input signal according to a predefined control algorithm (defined by control 12) applied by the switch module 24. As an example, the control 12 can include a control function that can include a plurality of rules that link the plurality of input components and the plurality of output components. In other examples, the control function can include a permutation that governs the correspondence between each of the output components and each of the input components. For example, the permutation can establish a one-to-one correspondence between each of the input components and each of the output components. The permutation can be embodied as a matrix, where the output components can be expressed as the product of a vector of the input components by a binary matrix that includes ones and zeroes.

The optical circuit switch 10 can be used to construct configurations of virtually any size based on the number of input and output ports. As an example, the optical circuit switch 10 can be based on a 16-wavelength ($\lambda_{0-15}$) dense wavelength division multiplexing (DWDM) structure. However, the number of wavelengths is variable and is a variable of the design. For example, four 100 GBase links (4×25 Gbps each) can be multiplexed on a single waveguide. However, more frequencies and groups can be used to expand the optical circuit switch 10.

In examples where the optical circuit switch 10 can be based on 16-wavelength ($\lambda_{0-15}$) DWDM, the switch can receive four groups of four frequencies in a 1310 nanometer wavelength range and can output four synchronous frequencies. The frequency spacing can depend on the total number of frequencies used and the free spectral range of the microring resonators used.

Figure 5:
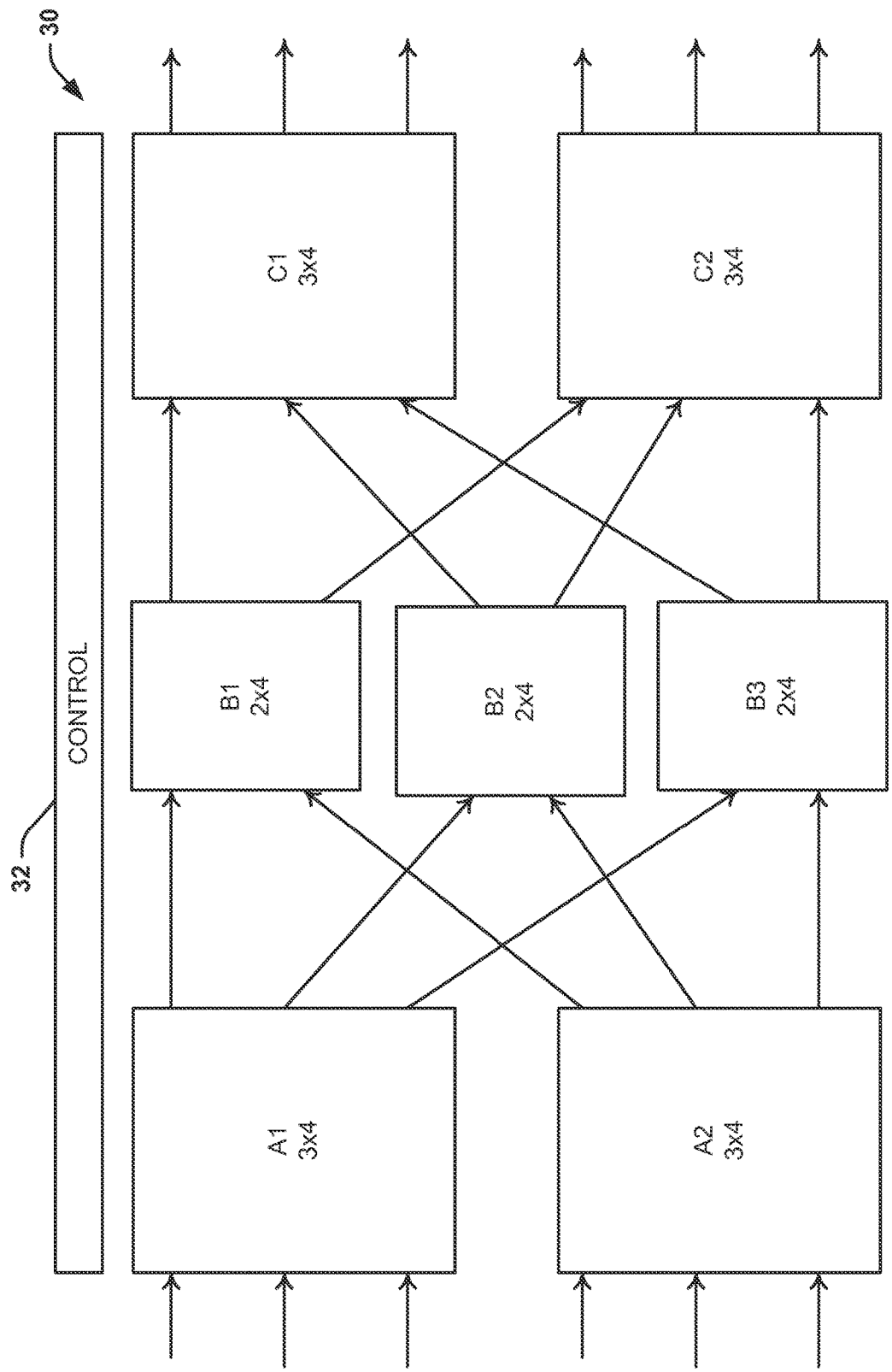
FIG. 5 illustrates an example configuration of a 24-port optical circuit switch.

FIG. 5 illustrates an example configuration of a 24-port optical circuit switch 30 whose inputs and outputs can be controlled by a control 32 that can establish a control function (or control algorithm) that can be used to determine the correlation between outputs and inputs. Although the example of a 24-port switch illustrated and explained, smaller or larger switches can be used in a similar manner. For example, the switch can be a 48-port switch that is constructed in a similar manner with four stages and one signal regenerator.

As illustrated, for each input port, the 24-port optical circuit switch 30 can map four external input frequencies of an external LAN to a single group of internal frequencies. In the 24-port example, four groups of four frequencies are used to give sixteen internal operating frequencies with a wavelength spacing in the nanometer range, where each of the sixteen wavelengths ($\lambda_{0-15}$) represents one wavelength that equivalent to one frequency.

Figure 6:
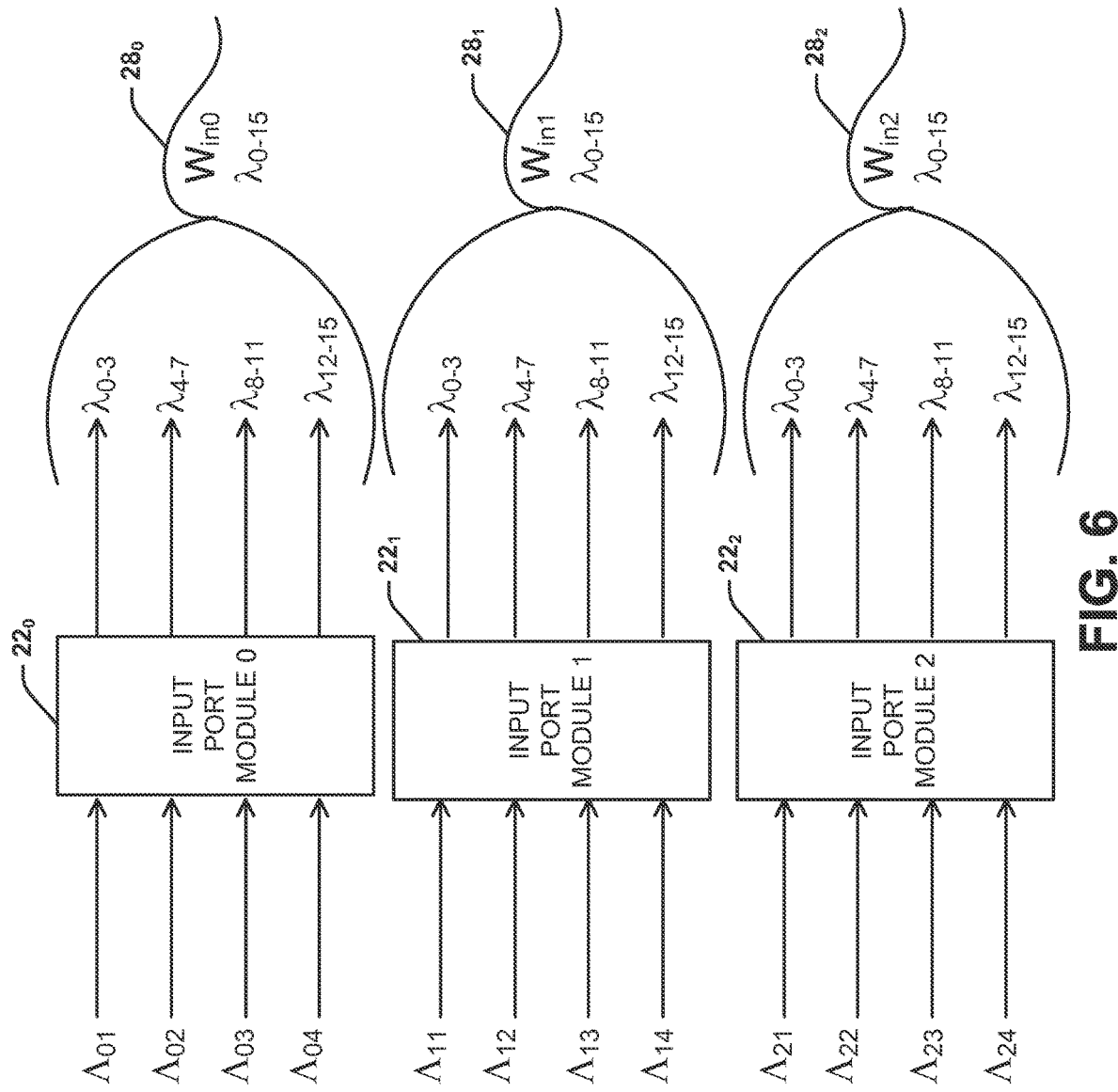
FIG. 6 illustrates an example of an input port module of a three-port optical circuit switch.

The 24-port optical circuit switch 30 can be viewed as the concentration of two sets of two twelve-port switches. A twelve-port non-blocking switch can be constructed from a 3×4 switch module (e.g., A1 or A2) with an input port module connected to each of its three input waveguides and an output port module attached to three output waveguides. FIG. 6 illustrates an example of an input of a 3×4 switch module with three input port modules 22₀, 22₁, 22₂ that can each receive a signal with four components (Λ1-4) corresponding to input ports of the respective input port module. For a given input port of an input port module, the corresponding input frequency can be mapped to an internal frequency group ($\lambda_{0-3}$, $\lambda_{4-7}$, $\lambda_{8-11}$, or $\lambda_{12-15}$) as determined by the switch routing logic.

One example of a set of rules that govern the mapping of 12 100 Gbase inputs that all use the same signaling frequencies. The input module can map the 100 Gbase frequencies of one input port to one of the four internal frequency groups.

Figure 7:
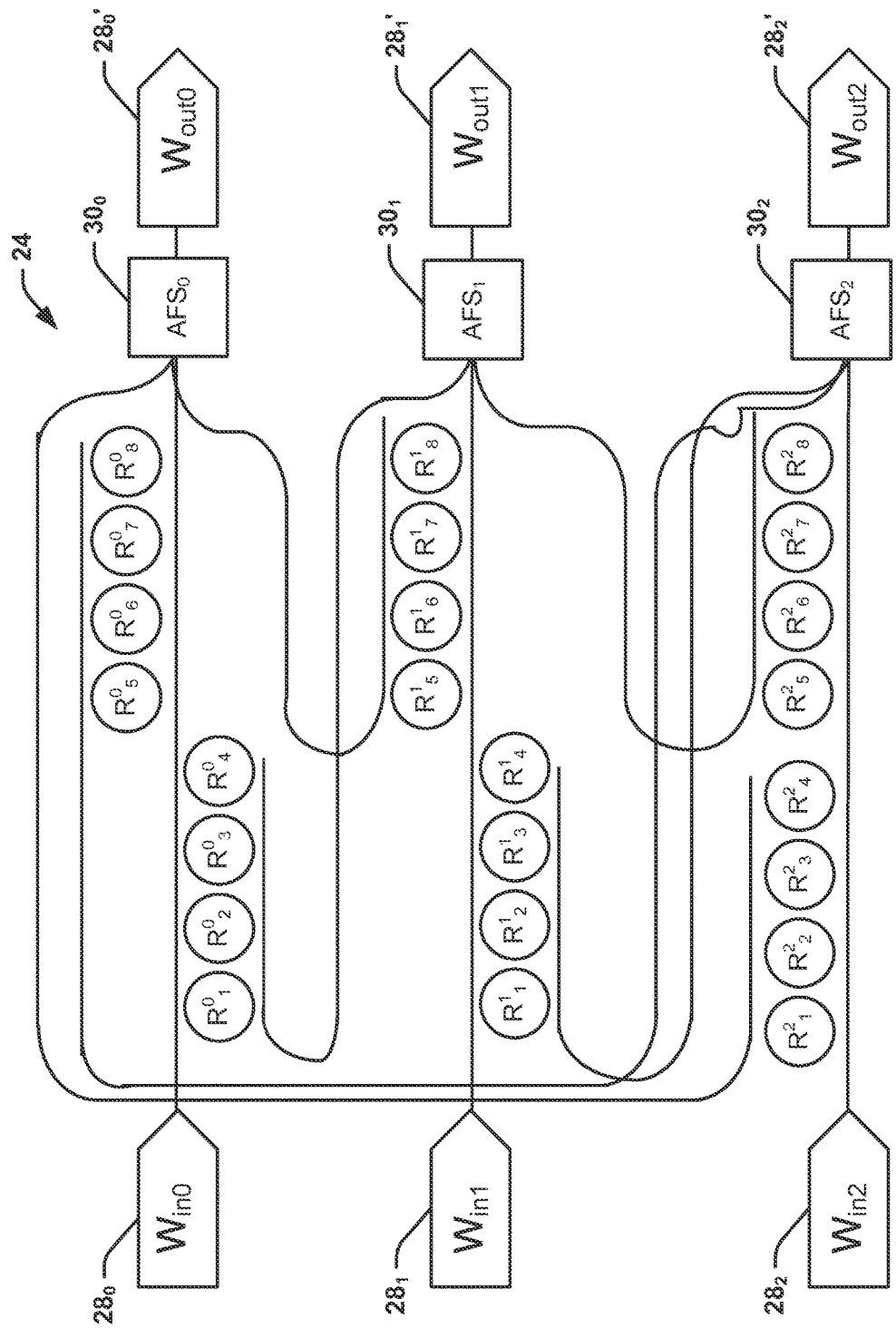
FIG. 7 illustrates an example of a switch module of a three-port optical circuit switch.

The internal frequency groups can be frequencies group resources that are managed by the switch routing logic that can be employed by the switch module, as shown in FIG. 7, to map the internal frequency group on one input waveguide to a known output waveguide that can be directed to a known output module. In other words, the switch module can allocate the routes from the inputs to the outputs. One example of a rule employed by the switch module can be that the internal frequency groups assigned to a pair of inputs cannot be the same if they are to be routed to the same output waveguide. It can be assumed that it is possible to map any input onto any output.

Each route can be made of three stages. One internal frequency group can be selected for each input component (Ixy where x=0-2 is the index of the input module and y=0-3 is the index of the input port within the module) at each input port that can carry the signal from the input port inside the switch. The signal can be routed to the output stage and converted to an output signal with an output frequency corresponding to the input frequency. The four different frequency groups available for each input block to map the four inputs are exclusive of each other. For example, I01 cannot be carried by the same frequency group as I02, but I01 and I11 can be. Four different frequency groups carried on a single waveguide are the inputs of the output port module. Permutations are allowed within one set of inputs so that one physical input (e.g., I01) can be assigned to any one of the four sets of internal frequency groups ($\lambda_{0-3}$, $\lambda_{4-7}$, $\lambda_{8-11}$, and $\lambda_{12-15}$).

As an example, the output of the switch can be expressed as the product of the input vector and a binary matrix that includes ones and zeroes, as shown below.

$$S[00:23]=M\times\Lambda[00:23],$$

where S is a vector that represents the 12 outputs and $\Lambda$ is a vector that represents the 12 inputs. M is a 12x12 symmetric matrix that includes mostly zeroes with a maximum of twelve coefficients equaling one. Only one coefficient can be equal to one in a line, and only one coefficient can be equal to one in a column, prohibiting multicast. Additionally, all of the coefficients of the diagonal are null unless loopback is allowed. Since the matrix is symmetric, only six routes need to be defined. An example algorithm for selecting assigning frequencies is shown below.

Step 1. All coefficients are zero at the beginning.
Step 2. Select one input cd, assign a frequency group $\Lambda$ij, and connect the output to ab. If ab and cd are in the same set (e.g., a=c), pick the next available frequency group for the reverse path (e.g., ab to cd). If ab and cd are not in the same set, select input ab, a different frequency group, connect to ab.
Step 3. Repeat 5 times, selecting a remaining frequency group each time.

For simpler execution of the algorithm, the cases where a c should be addressed first, then the cases where al=c.

Referring again to FIG. 5, the switch modules in the two 3x4 switches (A1 and A2) can be interconnected by six amplifying frequency shifters and the output ports of the two 3x4 switches (A1 and A2) can be coupled to three 2x4 switches (B1, B2, B3) at the input ports of a second set of two 3x4 switches (C1 and C2).

Figure 8:
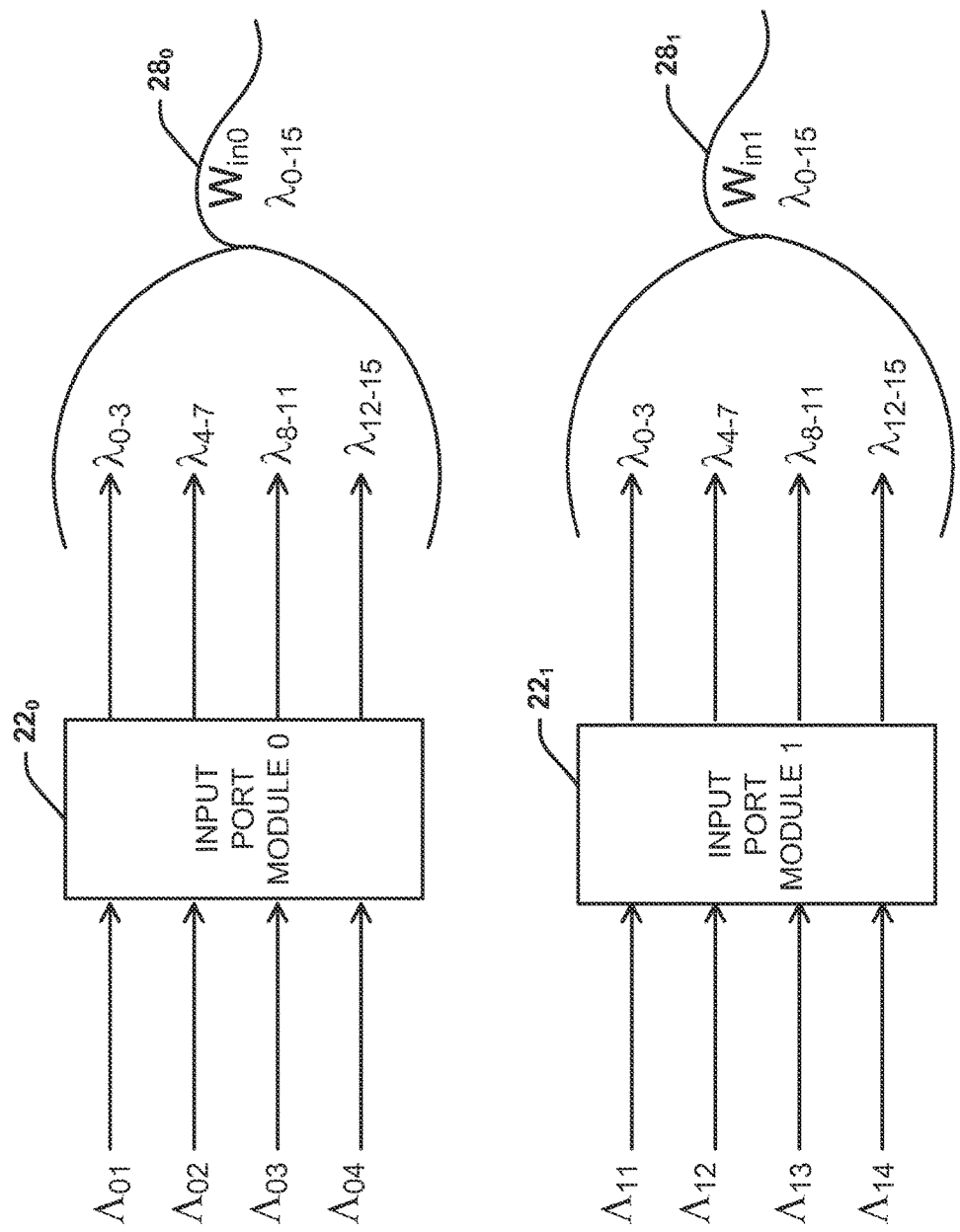
FIG. 8 illustrates an example of an input port module of a two-port optical circuit switch.

FIG. 8 illustrates an example of an input of a 2x4 switch module with two input port modules $22_0$, $22_1$ that can each receive a signal with four components ($\Lambda$1-4) corresponding to input ports of the respective input port module. For a given input port of an input port module, the corresponding input frequency can be mapped to an internal frequency group ($\lambda_{0-3}$, $\lambda_{4-7}$, $\lambda_{8-11}$, or $\lambda_{12-15}$) as determined by the switch routing logic.

Figure 9:
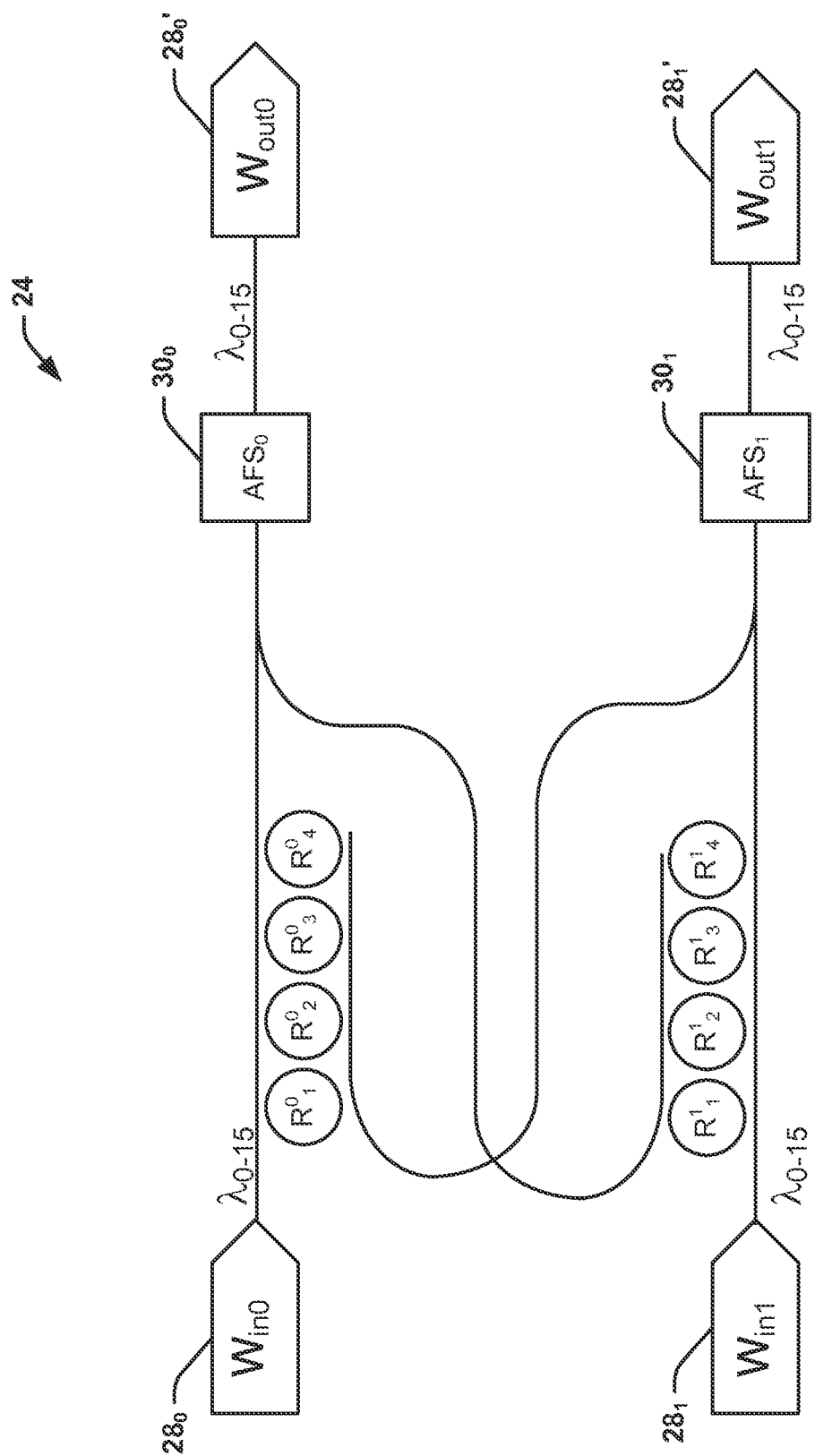
FIG. 9 illustrates an example of a switch module of a two-port optical circuit switch.

The internal frequency groups can be frequencies group resources that are managed by the switch routing logic that can be employed by the switch module, as shown in FIG. 9, to map the internal frequency group on one input waveguide to a known output waveguide that can be directed to a known output module. No frequency conversion is performed by the 2x4 switch. Instead, each ring resonator switches a given frequency group. It can be assumed that it is possible to map any input onto any output. Each input is redirected on one of the waveguides (Wout0 or Wout1). Not all combinations are possible. The relationships can be based on one or more rules. One example of a rule employed by the switch module can be that for any pair of inputs (X, Y), $\Lambda$x and $\Lambda$y cannot be on the same output waveguide if X=Y (mod 4). Additionally, some couples cannot go to different outputs (e.g., $\lambda_0$ and $\lambda_4$). FIG. 9 also illustrates an example of two amplifying frequency shifters, $AFS_0$ $30_0$ and $AFS_1$ $30_1$.

Figure 10:
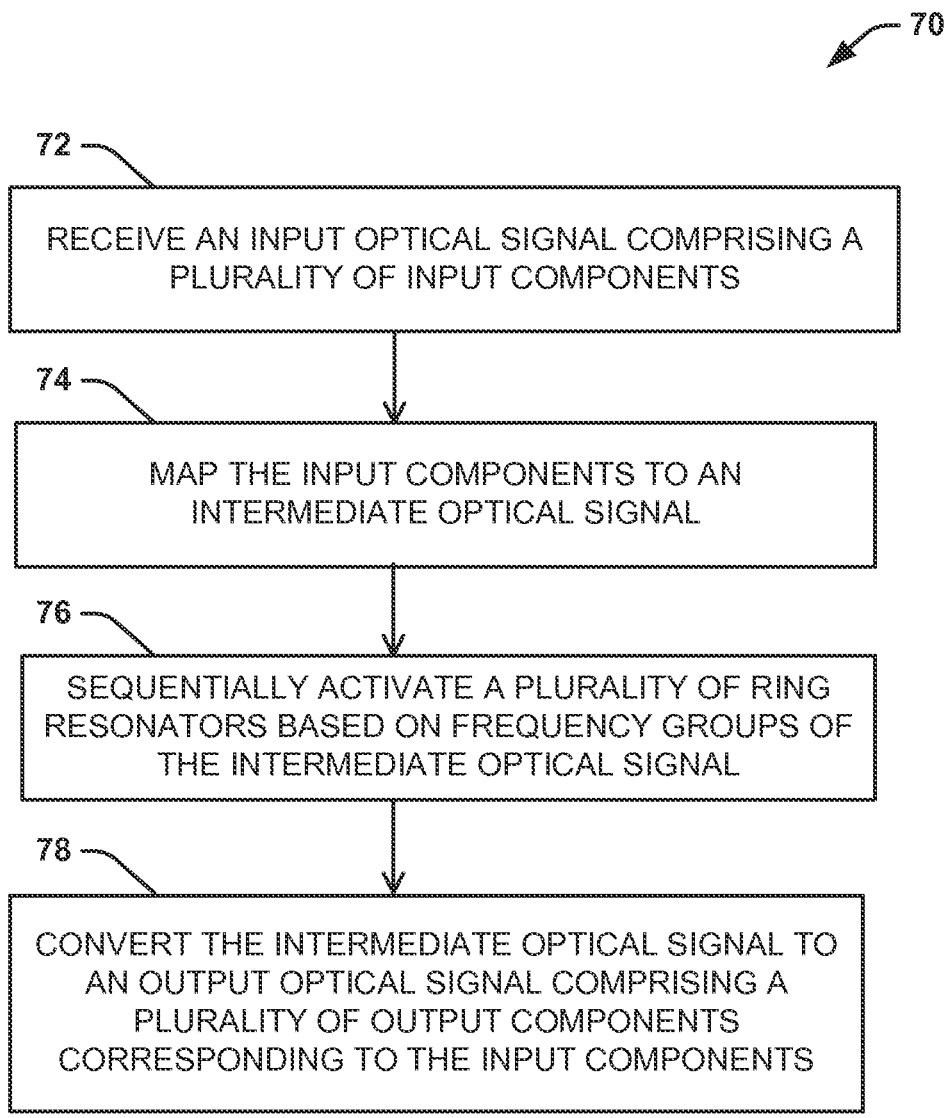
FIG. 10 illustrates an example of an example method for transferring data between two nodes in a network via an optical circuit switch.

FIG. 10 illustrates an example of a method 70 for transferring data between two nodes in a network via an optical circuit switch (e.g., based on the optical circuit switch 10 of FIG. 1). The method can be extended to different optical circuit switches (e.g., a 2x4 optical circuit switch, a 3x4 optical circuit switch, or the like, that can be used to construct a 12-port switch, a 24-port switch, a 48-port switch, or any other switch with a greater or lesser number of ports).

At 72, an input optical signal (e.g., IOS) can be received (e.g., at an input port module 22). The input optical signal can comprise a plurality of input components. For example, the plurality of input components can be at least four input components (e.g., $\Lambda$1, $\Lambda$2, $\Lambda$3, $\Lambda$4).

At 74, the input components can be mapped (e.g., by the input port module 22) to a first intermediate optical signal. The intermediate optical signal can include a corresponding plurality of unique, switchable frequency groups (e.g., four unique frequency groups). For example, the mapping can map a CWDM signal that is mapped to an intermediate DWDM signal that can be transmitted internally through the optical circuit switch. In some instances, the mapping can include multiplexing the components into the first intermediate optical signal. The intermediate optical signal can be transmitted on an internal waveguide.

At 76, a plurality of ring resonators can be activated based on frequency groups of the intermediate optical signal. For example, a series of ring resonators (e.g., $R^O_1$, $R^O_2$, $R^O_3$, and $R^O_4$ within switch module 24) can be sequentially activated based on the frequency groups of the first intermediate optical signals. The plurality of ring resonators can demultiplex the multiplexed signal carrying the different intermediate frequencies. For example, the group of frequencies carried by each frequency group can be blocked after the respective ring resonator and rerouted as a separate optical signal on the integrated circuit chip. For example, the ring resonators that activate for a particular frequency can be controlled by a predefined control algorithm.

At 78, the optical signal from the ring resonators can be converted to an output optical signal. The output optical signal can include a plurality of output components that can correspond to the plurality of input components as defined by a predefined control function (e.g., a control algorithm that can be applied by the switch module 24). The predefined control function can include a permutation that can govern a correspondence between each of the output components and each of the input components.

What have been described above are examples. It is, of course, not possible to describe every conceivable combination of components or methods, but one of ordinary skill in the art will recognize that many further combinations and permutations are possible. Accordingly, the disclosure is intended to embrace all such alterations, modifications, and variations that fall within the scope of this disclosure, including the appended claims. Additionally, where the disclosure or claims recite "a," "an," a first," or "another"

element, or the equivalent thereof, it should be interpreted to include one or more than such element, neither requiring nor excluding two or more such elements. As used herein, the term "includes" means includes but not limited to, and the term "including" means including but not limited to. The term "based on" means based at least in part on.

What is claimed is:

1. An optical circuit switch, comprising:
   an input port module comprising a plurality of input ports, each input port corresponding to an input frequency, the input port module configured to receive an input optical signal comprising a plurality of input components, perform an optical to electrical to optical conversion on the input optical signal, multiplex the plurality of input components to an internal optical signal according to a predefined control algorithm and transmit a first internal optical signal on a first internal waveguide, and map the input frequency of a given input port to an internal frequency group;
   a switch module to receive the internal optical signal and transmit the internal optical signal on a second internal waveguide according to a predefined control algorithm; and
   an output port module to receive the internal optical signal, perform another optical to electrical to optical conversion on the internal optical signal, and demultiplex the internal optical signal to an output optical signal comprising a plurality of output components.

2. The optical circuit switch of claim 1, wherein the switch employs a plurality of rules of the predefined control algorithm that link the plurality of input components and the plurality of output components.

3. The optical circuit switch of claim 1, wherein the switch module comprises a plurality of ring resonators that are each activated by a different one of a plurality of unique switchable internal frequency groups of the first internal optical signal.

4. The optical circuit switch of claim 1, wherein the input module and the output module each comprises a device to modulate light from respective laser sources.

5. The optical circuit switch of claim 1, wherein the first internal waveguide or the second internal waveguide is a silicon waveguide.

6. The optical circuit switch of claim 1, wherein the input signal and the output signal comprise a multi-frequency encoded signal.

7. The optical circuit switch of claim 1, wherein the switch module further comprises an amplifier and frequency shifter to perform amplification by detection of a weaker optical signal and regeneration of a stronger optical signal.

8. The optical circuit switch of claim 1, wherein the switch is non-blocking.

9. The optical circuit switch of claim 1, wherein the input optical signal and the output optical signal are coarse wavelength division data multiplexing (CWDM) signals and the first internal optical signal and the second internal optical signal are dense wavelength division multiplexing (DWDM) signals.

10. A method, comprising:
    receiving an input optical signal comprising a plurality of input components, wherein the input optical signal is received by an input port module comprising a plurality of input ports, each input port corresponding to an input frequency;
    mapping the plurality of input components to an intermediate optical signal;
    activating a plurality of ring resonators based on frequency groups of the intermediate optical signal; and
    converting the intermediate optical signal to an output optical signal comprising a plurality of output components corresponding to the plurality of input components based on a predefined control algorithm.

11. The method of claim 10, further comprising multiplexing the plurality of input components to an internal optical signal for transmission on a silicon waveguide.

12. The method of claim 10, wherein the predefined control algorithm comprises a permutation that governs a correspondence between each of the output components and each of the input components.

13. The method of claim 12, wherein the permutation establishes a one-to-one correspondence between respective output components and input components.

14. The method of claim 10, further comprising performing an optical to electrical to optical transmission on the internal optical signal for amplification.

* * * * *